US009210710B2

(12) United States Patent
Robert Safavi et al.

(10) Patent No.: US 9,210,710 B2
(45) Date of Patent: Dec. 8, 2015

(54) TRANSMISSION OF CHANNEL STATE INFORMATION IN A WIRELESS COMMUNICATION SYSTEM

(71) Applicant: HUAWEI TECHNOLOGIES CO., LTD., Shenzhen, Guangdong (CN)

(72) Inventors: Anahid Robert Safavi, Kista (SE); Branislav Popovic, Kista (SE)

(73) Assignee: HUAWEI TECHNOLOGIES CO., LTD., Suwon-Si (KR)

( * ) Notice: Subject to any disclaimer, the term of this patent is extended or adjusted under 35 U.S.C. 154(b) by 153 days.

(21) Appl. No.: 14/153,426

(22) Filed: Jan. 13, 2014

(65) Prior Publication Data
US 2014/0126436 A1 May 8, 2014

Related U.S. Application Data

(63) Continuation of application No. PCT/CN2011/077090, filed on Jul. 13, 2011.

(51) Int. Cl.
H04W 72/04 (2009.01)
H04B 1/52 (2015.01)
H04B 7/06 (2006.01)
H04W 52/24 (2009.01)

(52) U.S. Cl.
CPC ............ *H04W 72/0473* (2013.01); *H04B 1/52* (2013.01); *H04B 7/063* (2013.01); *H04B 7/0632* (2013.01); *H04B 7/0639* (2013.01); *H04W 52/242* (2013.01); *H04W 52/244* (2013.01)

(58) Field of Classification Search
CPC .................................................. H04W 72/0473
USPC .......................................................... 370/329
See application file for complete search history.

(56) References Cited

U.S. PATENT DOCUMENTS 7,629,902 B2 * 12/2009 Zhang et al. .................. 341/106
8,265,566 B2 *  9/2012 Golitschek ................... 455/67.7

(Continued)

FOREIGN PATENT DOCUMENTS

CN          1860693 A     11/2006
CN          1906870 A      1/2007
CN        101902780 A     12/2010

OTHER PUBLICATIONS

International Search Report, dated Apr. 12, 2012, in corresponding International Application No. PCT/CN2011/077090 (2 pp.).

(Continued)

*Primary Examiner* — Rasheed Gidado
(74) *Attorney, Agent, or Firm* — Staas & Halsey LLP

(57) ABSTRACT

A wireless communication system includes at least one transmit node having at least two transmit antenna ports, and at least one receive node having at least one receive antenna port. User information is transmitted between the at least two transmit antenna ports and the at least one receive antenna port on a radio propagation channel. A reconstructed channel state information (R-CSI) for a reconstructed radio propagation channel is computed. The reconstructed radio propagation channel is obtained as an estimated radio propagation channel compensated by a function of an estimated signal power imbalance between the at least two transmit antenna ports. And an indicative of the estimated signal power imbalance and the R-CSI is sent to the at least one transmit node.

20 Claims, 9 Drawing Sheets

(56) References Cited

U.S. PATENT DOCUMENTS

| | | | |
|---|---|---|---|
| 8,526,878 B2* | 9/2013 | Maruhashi et al. | 455/39 |
| 8,699,602 B2* | 4/2014 | Chen et al. | 375/267 |
| 8,767,668 B2* | 7/2014 | Luschi et al. | 370/330 |
| 8,830,839 B2* | 9/2014 | Gan et al. | 370/236 |
| 2005/0111376 A1 | 5/2005 | Raghothaman et al. | 370/252 |
| 2009/0041165 A1* | 2/2009 | Higashinaka | 375/341 |
| 2009/0093222 A1 | 4/2009 | Sarkar | 455/115.1 |
| 2011/0026420 A1 | 2/2011 | Zhang et al. | |
| 2012/0076238 A1 | 3/2012 | Catreux et al. | 375/299 |
| 2012/0176921 A1* | 7/2012 | Abraham et al. | 370/252 |
| 2013/0201912 A1* | 8/2013 | Sheng et al. | 370/328 |

OTHER PUBLICATIONS

"Coexistence of Fixed Broadband Wireless Access Systems," *IEEE Recommended Practice for Local and metropolitan area networks*, Mar. 17, 2004, pp. i-xviii; 1-151, IEEE Std 802.16.2™ Jan. 2004 (Revision of IEEE Std 802.16.2™ Jan. 2001), The Institute of Electrical and Electronics Engineers, Inc., New York, New York.

Amari, Satoru, Hiroshi Iwai, Koichi Ogawa, and Atsushi Yamamoto, "Effects of Received Power Imbalance on the Channel Capacity of a Handset MIMO," Paper presented at *The 18th Annual IEEE International Symposium on Personal, Indoor and Mobile Radio Communications (PIMRC'07)*, Sep. 3-7, 2007, pp. 1-5, Matsushita Electric Industrial Co., Ltd., Athens, Greece.

R1-111330, "Considerations on Real-Life DL MIMO Aspects," 3GPP TSG-RA WG1 #64, May 9-13, 2011, pp. 1-4, Agenda Item 6.3.2.1, Ericsson and ST-Ericsson, Barcelona, Spain.

R1-111434, "Real-Life Scenarios for Downlink MIMO Enhancement," 3GPP TSG-RAN WG1 #65, May 9-13, 2011, pp. 1-4, Agenda Item 6.3.2.1, Alcatel-Lucent and Alcatel-Lucent Shanghai Bell, Barcelona, Spain.

International Search Report issued Apr. 12, 2012, in corresponding International Patent Application No. PCT/CN2011/077090.

Extended European Search Report issued on Jul. 18, 2014 in corresponding European Patent Application No. 11 867 553.7.

Shu Wang: 3GPP2 Draft; C30-20090817-020R2_VIA_RL_MTD, $3^{rd}$ Generation Partnership Project 2, 3GPP2, 2500 Wilseon Boulevard Suite 300, Arlington Virginia 22201; USA.

Research in Mortion et al: "Downlink CSI Feedback for Low-Power Nodes", 3GPP Draft; R1-111662 (RIM—CSI Feedback for Low-Power Node), $3^{rd}$ Generation Partnership Project (3GPP), Mobile Competence Centre; 650, Route Des Lucioles; F-06921 Sophiaantipolis Cedex; France, vol. RAN WG1, No. Barcelona Spain; 20110509, May 3, 2011, XP050491289.

* cited by examiner

TRANSMISSION OF CHANNEL STATE INFORMATION IN A WIRELESS COMMUNICATION SYSTEM

CROSS-REFERENCE TO RELATED APPLICATIONS

This application is a continuation of International Application No. PCT/CN2011/077090, filed on Jul. 13, 2011, of which is hereby incorporated by reference in its entirety.

FIELD

The present disclosure relates to transmission of channel state information (CSI) in a wireless communication system. Furthermore, the disclosure also relates to a method in a receive node, a method in a transmit node, a computer program, a computer program product, a receive node device, a transmit node device, and a wireless communication system comprising a receive node device and a transmit node device.

BACKGROUND

3GPP Long Term Evolution (LTE) Multiple Input Multiple Output (MIMO) system and related codebook enabled spatial multiplexing are designed basically based on co-located transmit antenna port configurations, or on the assumption that there is no average power mismatch between the propagation paths. For such a scenario where receive antenna ports are well-balanced in terms of the received power, considerable MIMO gain can be expected related to the usage of corresponding precoders and consequently a satisfactory throughput.

However, in the case of geographically separated transmit antenna ports deployment, a receive antenna port close to one transmit antenna port and far from another one, undergoes a very large difference of the received signal powers from different transmit antenna ports.

It has been shown that received power imbalance of the signals transmitted over a MIMO channel results in reduced rank, i.e. the number of orthogonal propagation paths of the MIMO channel observed at the receiver. Thus rank 1 (or generally a low rank) reporting and transmission will be more likely in that case, which will reduce the throughput compared to the co-located antenna scheme even if the received signal power close to one antenna is considerably high.

In a real-life deployment there are several types of imperfections which can results in mismatches associated with antenna arrays creating non-balanced propagation conditions, such as mismatches due to the physical antenna system structure (i.e. spacing) or mismatches due to the hardware elements used in the transmit/receive chains for each antenna port. Another type of mismatch consists of mismatches created as an effect due to hand gripping of mobile terminals. Hence, a mismatch leads to a power imbalance seriously effecting throughput of the communication system.

SUMMARY

The present disclosure addresses technical solutions with increased throughput and/or capacity when signal power imbalance is present at receive antenna port(s) in multiple antenna ports wireless communication systems.

According to an aspect of the disclosure, a method is provided for channel state information transmission in a wireless communication system, said wireless communication system comprising at least one transmit node having at least two transmit antenna ports, and at least one receive node having at least one receive antenna port; wherein transmission of user information between said at least two transmit antenna ports and said at least one receive antenna port being performed on a radio propagation channel; said method comprising the steps of:

estimating a signal power imbalance between said at least two transmit antenna ports; computing a reconstructed channel state information (R-CSI) for a reconstructed radio propagation channel, said reconstructed radio propagation channel being obtained as an estimated radio propagation channel compensated by a function of said estimated signal power imbalance;

sending an indicative of said estimated signal power imbalance and said reconstructed channel state information (R-CSI) to said at least one transmit node; and transmitting user information from said at least two transmit antenna ports to said at least one receive antenna port using said estimated signal power imbalance and said reconstructed channel state information (R-CSI).

Different embodiments of the method in a wireless communication system are disclosed in dependent claims.

According to another aspect of the disclosure, a method is provided in a receive node adapted for communication in a wireless communication system, said receive node having at least one receive antenna port being adapted for receiving user information from a transmit node having at least two transmit antenna ports for transmission of user information, wherein transmission of user information between said at least two transmit antenna ports and said at least one receive antenna port being performed on a radio propagation channel; said method comprising the steps of:

estimating a signal power imbalance between said at least two transmit antenna ports; computing a reconstructed channel state information (R-CSI) for a reconstructed radio propagation channel, said reconstructed radio propagation channel being obtained as an estimated radio propagation channel compensated by a function of said estimated signal power imbalance; and sending an indicative of said estimated signal power imbalance and said reconstructed channel state information (R-CSI) to said at least one transmit node.

According to yet another aspect of the disclosure, a method is provided in a transmit node adapted for communication in a wireless communication system, said transmit node having at least two transmit antenna ports being adapted for transmitting user information to a receive node having at least one receive antenna port for receiving user information, wherein transmission of user information between said at least two transmit antenna ports and said at least one receive antenna port being performed on a radio propagation channel; said method comprising the steps of:

receiving an indicative of said estimated signal power imbalance between said at least two transmit antenna ports and a reconstructed channel state information (R-CSI) for a reconstructed radio propagation channel from said receive node, said reconstructed radio propagation channel being obtained as an estimated radio propagation channel compensated by a function of said estimated signal power imbalance, and using said estimated signal power and said reconstructed channel state information (R-CSI) for transmission of user information from said at least two transmit antenna ports to said at least one receive antenna port.

The disclosure further relates to a computer program and a computer program product corresponding to the above mentioned methods, and to corresponding transmit node and receive node devices.

With the use of a transmission method according to the disclosure in a wireless communication system the equivalent propagation channel measured at the receiver node becomes balanced which provides an improved capacity over an unbalanced propagation channel. Improved channel capacity results in increased system throughput compared to a non-balanced propagation channel.

The present disclosure provides a satisfactory MIMO gain and increased throughput in cases with antenna deployments or propagation conditions that create non-balanced received signal power at receive antenna port(s).

Furthermore, the present disclosure may also be used in wireless communication systems employing FDD as an effective way for mitigating non-balanced received signal power at receive antenna port(s).

Other advantages and applications of the present disclosure will be apparent from the following disclosure.

BRIEF DESCRIPTION OF THE DRAWINGS

The appended drawings are intended to clarify and explain different embodiments of the present disclosure in which.

EMBODIMENTS

Figure 1:
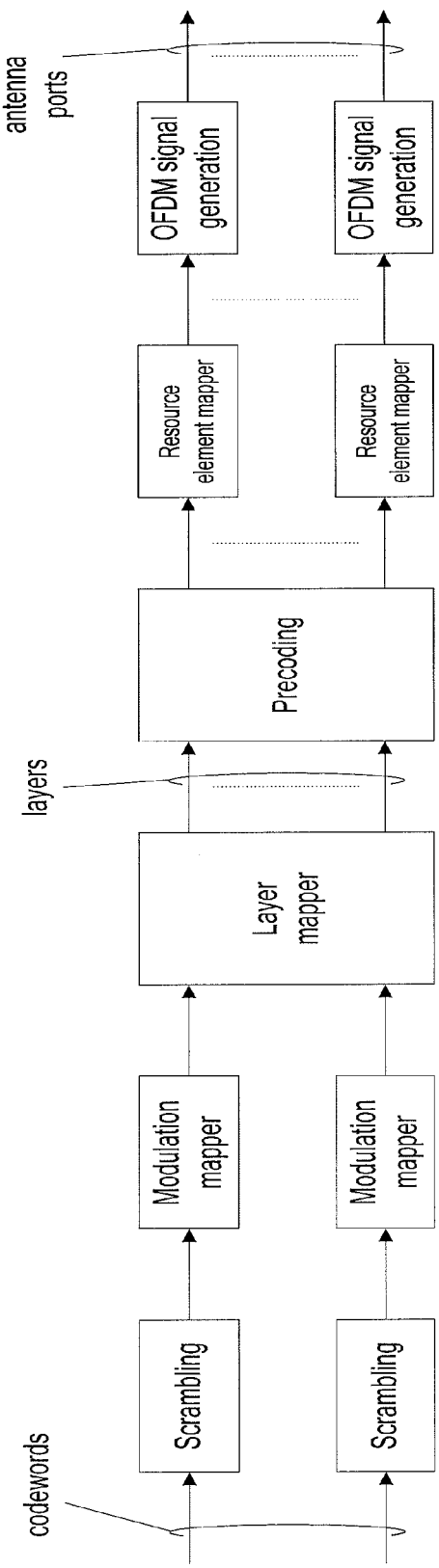
FIG. 1 shows an overview of downlink physical channel processing in LTE.

FIG. 1 shows a block diagram related to downlink (DL) transmission using linear precoding in 3GPP Long Term Evolution (LTE) Rel. 8/9/10 communication system using several transmit antenna ports. The antenna ports in FIG. 1 are baseband inputs into corresponding separate antenna systems. An antenna system consists of an RF chain connected to one or multiple antenna elements that together produce a desired electro-magnetic radiation pattern. If there is more than one transmit antenna port and more than one receive antenna port, the transmission is usually classified as Multiple Input Multiple Output (MIMO) transmission. The corresponding radio propagation paths between each transmit antenna port and each receive antenna port jointly define a propagation channel, and if there are more than one transmit antenna port and more than one receive antenna port, the propagation channel is called a MIMO propagation channel.

A wireless communication system deploying several transmit antenna ports as shown in FIG. 1 comprises also other important transmit elements such as transmit linear precoders, etc. The purpose of transmit linear precoding is to match the instantaneous MIMO channel realizations, i.e. the instantaneous propagation attenuation coefficients between each transmit and each receive antenna port. After the corresponding receive linear precoding all the signals received from all transmit antenna ports at all receive antenna ports are coherently combined in an optimum way, so as to maximise the received information throughput. Examples of various linear precoding schemes can be found in IEEE 802.16-2005 and LTE Rel. 8/9/10 standards.

Further, depending on the availability of the MIMO channel information available at the transmitter, the communication system can be classified as employing closed-loop precoding or open-loop precoding.

In order to perform closed loop precoding on the downlink, a receiver in a User Equipment (UE) has to estimate the corresponding downlink channel and report the estimated channel information to an eNB. In order to reduce the overhead of directly reporting quantized estimated channel, a set of codebooks consisting of a number of precoding matrices roughly representing the true channel is defined. The UE uses the knowledge of the estimated channel for selecting an appropriate precoder from the set of predefined codebooks, where each codebook corresponds to a different transmission rank, i.e. the number of strings or vectors to be transmitted on different antenna ports. The selection of the most appropriate precoder is done by calculating an estimated Channel Quality Information (CQI) for each defined precoding matrix in all codebooks. The index of the precoder producing the best CQI, usually denoted as the Precoding Matrix Indicator (PMI), is transmitted to the eNB along with the rank of the codebook to which the PMI belongs. The rank, the PMI and the CQI are usually jointly denoted as Channel State Information (CSI).

The CSIs from different active UEs are used in the eNB to select the most appropriate UE or UEs to be served (scheduled) in the first next available transmission time interval. Besides, the CSI serves at eNB as a reference to determine the optimum transmission and precoding parameters to the UEs chosen to be served.

For example, the LTE Rel.8 standard uses four codebooks, which in total contain 64 matrices for up to 4 transmit antenna ports, and different ranks between 1 and 4. Therefore, an UE can feedback the appropriate precoder to represent the estimated DL channel using only 6 information bits instead of large number of channel quantization bits. Codebooks are designed and optimized for certain channel antenna system configurations and consequently certain propagation environments. For example the codebooks of LTE Rel.8 are designed assuming co-located transmit antenna ports. Co-located transmit antenna ports produce power-balanced propagation paths from different antenna ports towards receive antenna ports of an UE.

Another linear precoding scheme is called open loop precoding, i.e. channel-independent precoding. The major difference between closed loop and open loop scheme is that in the open loop scheme the used precoding matrices are predefined and there is no precoding matrix selection. As both eNB and UE know the predefined precoding matrices, the UE only feeds back CQI and selected rank to the eNB.

Moreover, the communication system may support various Reference Signals (RS) in the downlink to facilitate channel estimation, coherent demodulation and computation of CSI feedback. A reference signal is a signal generated using the modulation (information) symbols known in advance at the receiver. For LTE Rel. 8/9/10 downlink there is different types of reference signals:

CSI reference signals (CSI-RSs), which are exclusively used for measurement purpose including downlink channel estimation and computing CSI feedback of desired UE. The CSI-RSs are UE-specific;

Demodulation (DM) reference signals (DM-RSs), which are sent to a specified scheduled UE and used for demodulation of a downlink transmission from the eNB. The DM-RSs are UE-specific;

Common reference signals (C-RSs), which are used for both measurement and data demodulation. The C-RSs are cell-specific.

Common reference signals are mainly used for Rel. 8/9 systems. For Rel. 10 systems separated reference signals for demodulation and measurement, i.e. DM-RS and CSI-RS have been introduced. As aforementioned, DM-RS and CSI-RS reference signals are user-specific i.e. they correspond to transmission related to one specific user, e.g. one UE, and can therefore be classified as user information. Data transmission can also be considered as user information as it is specific to one particular user.

Figure 2:
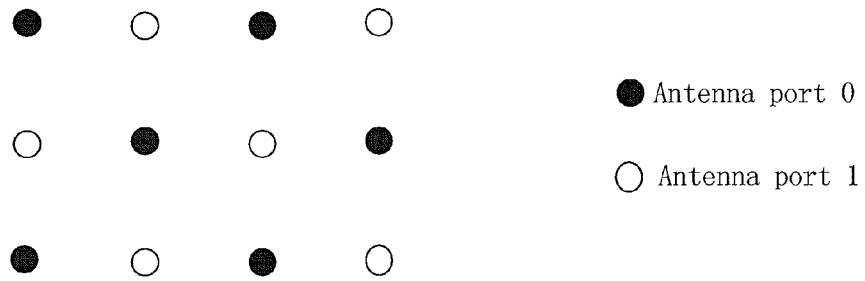
FIG. 2 shows an example of geographically separated antenna ports, wherein the different antenna ports are deployed in an interleaved manner.

In practice, antenna ports might be located apart from each other in a site for different reasons fulfilling for example different type of deployments creating so called geographically separated or distributed antennas. A distributed antenna system for indoor use is a classical example of a scenario where cell coverage over an area is typically ensured by deploying many antennas at different locations. One example of deployment of geographically separated antennas is to locate them in an interleaved manner, as shown in FIG. 2.

Another example of geographically separated antenna ports may be found in Coordinated Multipoint Transmission (COMP) transmission systems. One example of such systems is when a base station radio frequency part is implemented as multitude of geographically separated Radio Resource Units (RRUs) connected to a common and possibly geographically separated base-band processing unit.

LTE MIMO systems and related codebooks enabling spatial multiplexing were designed basically based on co-located transmit antenna port configurations, or on the assumption that there is no average power mismatch between the propagation paths. For such a scenario where receive antenna ports are well-balanced in terms of the received power, considerable MIMO gain can be expected related to the usage of corresponding precoders and consequently a satisfactory throughput.

However, in the case of geographically separated transmit antenna port deployments, the receive antenna ports close to one of the transmit antenna ports and far from others, undergoes a very large difference of the received signal powers from different transmit antenna ports.

It has been shown that the received power imbalance of the signals transmitted over a MIMO channel results in reduced rank, i.e. the number of orthogonal propagation paths of the MIMO channel observed at the receiver. Thus rank 1 (or generally a low rank) reporting and transmission will be more likely in that case, which will reduce the throughput compared to the co-located antenna scheme even if the received signal power close to one antenna is considerably high.

Figure 3:
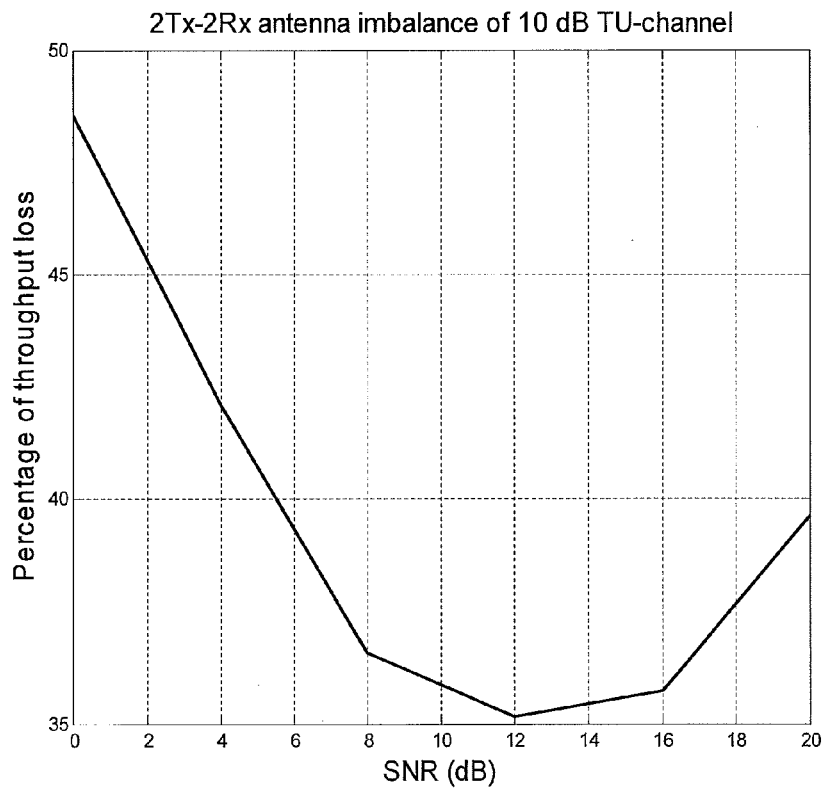
FIG. 3 shows a graph of percentage of throughput loss related to power imbalance of 10 dB on received antenna ports.

In the following it is shown how this imbalance affects the system. The percentage of throughput loss related to power imbalance at received antenna ports has been simulated and is shown in FIG. 3. In this simulations with two transmit antenna ports and two receive antenna ports, a power attenuation of 10 dB was applied at the transmitter side over the second transmit antenna port. Throughput losses related to this imbalance is plotted in this figure. There is a considerable throughput loss up to 48% due to this mismatch even for very high values of Signal to Noise Ratio (SNR).

There is a theoretical value called Condition Number (CN) which is strictly related to the channel capacity and consequently throughput which is defined as the imbalance between the eigenvalues of $HH^H$ where H denotes the propagation channel matrix and $(.)^H$ denotes transpose conjugate of that matrix. In other terms:

$$CN = 10 \times \log_{10}\left(\frac{\lambda_{max}}{\lambda_{min}}\right),$$

where $\lambda_{max}$ and $\lambda_{min}$ are the maximum and the minimum eigenvalue of the matrix $HH^H$, respectively. In order to exploit the potential of spatial multiplexing mode using precoders, condition number values should not be too high (e.g. more than 15 dB) in practice. High values of condition numbers stand for rank-deficient, i.e. not full rank, channel matrices. In addition to condition number, SNR is also of crucial importance to achieve good throughput.

Figure 4:
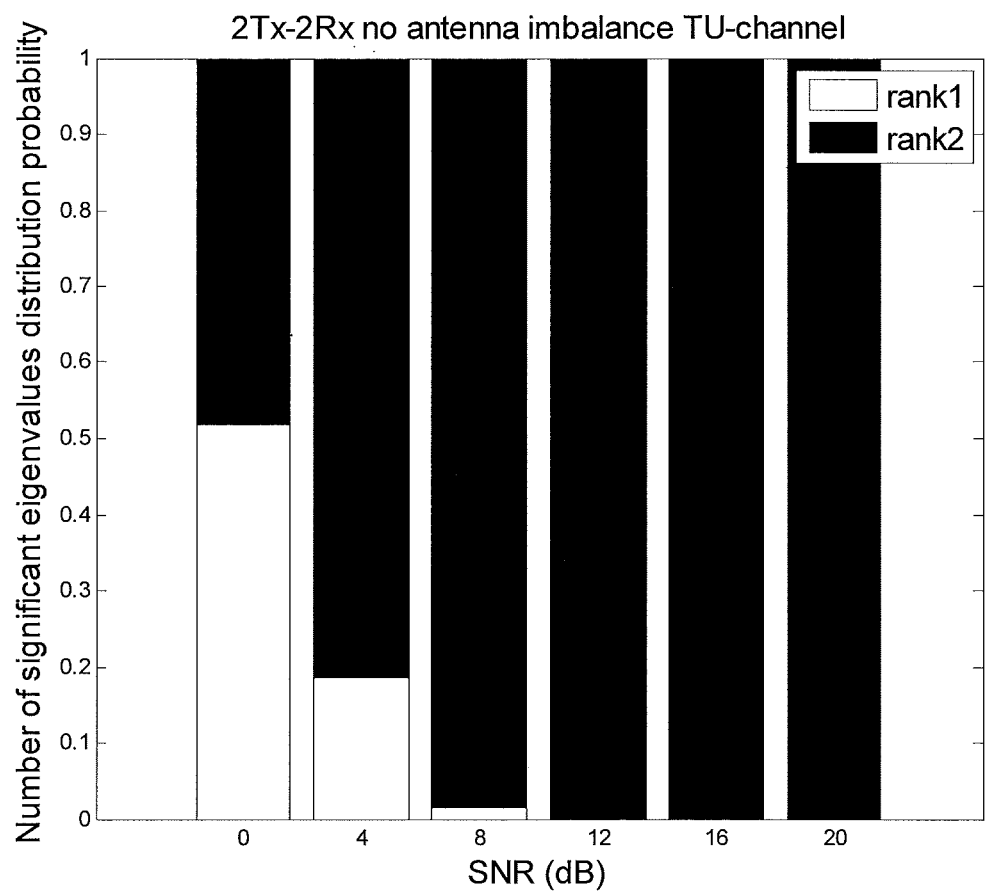
FIG. 4 shows number of significant eigenvalues when there is no receive antenna port power imbalance.

A precise characterisation of a propagation channel is obtained as the number of significant eigenvalues of the propagation channel. The distribution probability related to the number of significant eigenvalues of a 2×2 Typical Urban (TU) channel is plotted in FIG. 4.

Figure 5:
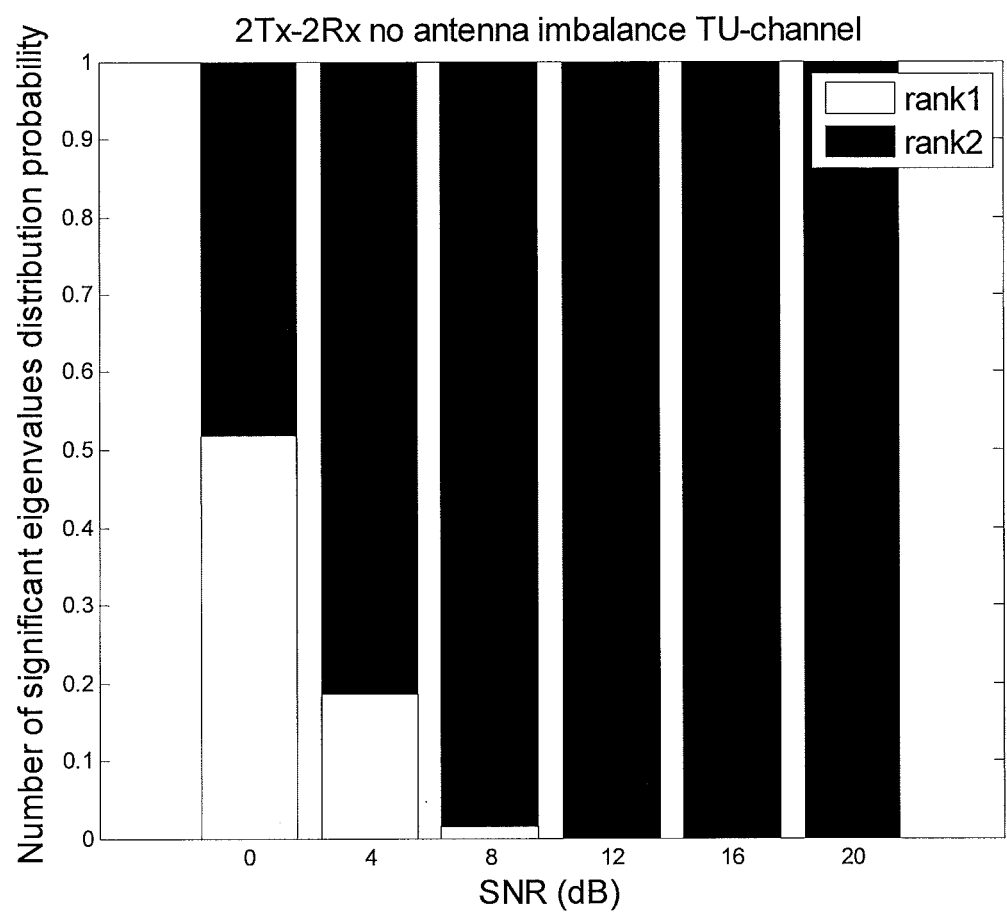
FIG. 5 shows rank distribution when there is no receive antenna port power imbalance.

In practice, reported rank from the UE is not measured using singular value decomposition, but instead using expected maximum achievable throughput considering the corresponding precoder. Reported rank from the UE is shown in FIG. 5, in the case when there is no received power (Rx) imbalance, and in FIG. 6 in the case when there is Rx power imbalance correspondingly.

Figure 6:
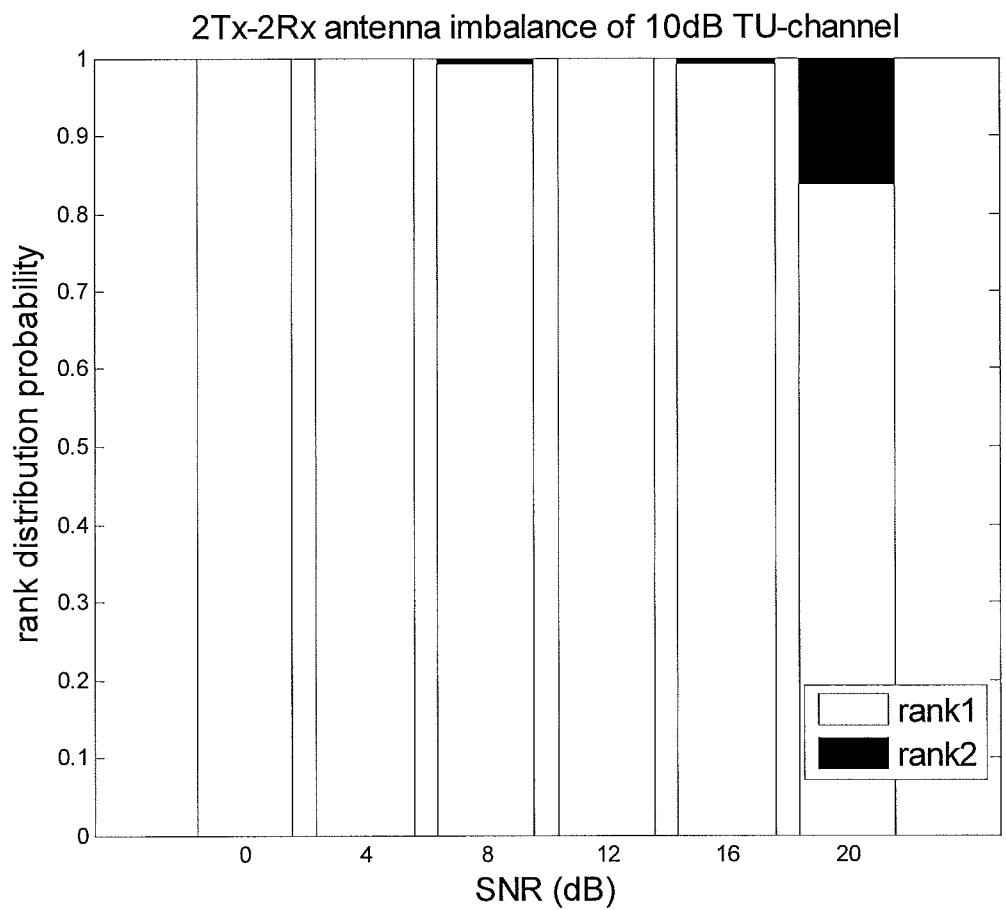
FIG. 6 shows rank distribution with a receive antenna port power imbalance of 10 dB.

From mentioned figures it may be concluded that rank 1 is reported almost all the time when there is an antenna gain imbalance of 10 dB even for very high values of SNR, see FIG. 6. As rank 1 is selected most of the time, throughput is seriously affected comparing to the case where there is no power imbalance and where rank 2 is reported all the time.

The equivalent propagation channel seen at the receiver for a m×n MEM system, in the case of antenna imbalance can be written as follows:

$$H_{\text{eff}} = \begin{bmatrix} h_{11} & h_{12} & \ldots & h_{1n} \\ h_{21} & h_{22} & \ldots & h_{2n} \\ \vdots & \vdots & \vdots & \vdots \\ h_{m1} & h_{m2} & \ldots & h_{mn} \end{bmatrix} \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}. \quad (1)$$

It means that the equivalent propagation MIMO channel can be decomposed into the product of two matrices, one modelling fading coefficients and the other one modelling the propagation loss or received signal power imbalance. It is important to mention that this equivalent channel is seen at the receiver for both demodulation and measurement.

In the above equation, $\alpha_1, \ldots, \alpha_{n-1}$ denote signal power imbalance associated to each transmit antenna port and computed compared to a predetermined reference transmit antenna port (the first antenna port in this equation). This value is measured at each received antenna port separately. As it is shown in equation (1) the estimated channel is modified by (a function) square root of the signal power imbalance, i.e. signal gain imbalance. The signal gain imbalance affects the channel coefficients resulting in a signal power imbalance which is measured in practice at the receive node. The signal gain imbalance can be stated as the square root of measured power imbalance as shown in equation (1). Furthermore, $h_{ij}$ denotes radio propagation channel coefficient between receive antenna port i and transmit antenna port j, m denotes the number of receive antenna ports, and n denotes the number of transmit antenna ports, respectively in equation (1).

The idea is to compensate this attenuation on one transmit antenna port in a way that overall equivalent propagation path seen at the receiver becomes balanced. When attenuation is compensated, the equivalent channel seen at the receiver will be the same as the initial channel without imbalance i.e.:

$$H'_{eff} = H_{eff} \times \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1} \quad (2)$$

Aforementioned compensation is considered over measurement and data transmission separately to achieve desired performance as both CSI computation and data demodulation are affected by this imbalance.

Equation (1) describes the case where signal power imbalance is computed compared to a predefined transmit antenna port. In a general case signal power imbalance can be computed over each transmit antenna. In this case related equations are the followings:

$$H_{eff} = \begin{bmatrix} h_{11} & h_{12} & \ldots & h_{1n} \\ h_{21} & h_{22} & \ldots & h_{2n} \\ \vdots & \vdots & \vdots & \vdots \\ h_{m1} & h_{m2} & \ldots & h_{mn} \end{bmatrix} \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix} \quad (3)$$

With $\alpha_0, \ldots, \alpha_{n-1}$ being signal power imbalance associated to each transmit antenna port. This value is measure at each receive antenna port separately. The equivalent channel seen at the receiver after compensation is:

$$H'_{eff} = H_{eff} \times \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1} \quad (4)$$

Therefore, to achieve the aforementioned objects, the present disclosure relates to a method for transmission in a wireless communication system. The method involves estimating a signal power imbalance between transmit antenna ports of a transmit node and receive antenna port(s) of a receive node. Thereafter, reconstructed channel state information (R-CSI) for a reconstructed radio propagation channel is computed, where the reconstructed radio propagation channel is obtained as a radio propagation channel compensated by a function of the estimated signal power imbalance.

The estimated signal power imbalance and the R-CSI is sent to the transmit node as an indicative; and user information is sent from antenna ports of the transmit node to receive antenna port(s) with the use of the estimated signal power imbalance and the R-CSI. In the following disclosure details for different steps of this procedure will be described and explained.

Estimation of Received Power Imbalance

There are two alternative definitions for power imbalance according to two different embodiments of the disclosure.

According to the first definition, the power imbalance is measured received power, associated to each transmit antenna port, measured at the receive antenna port(s), separately. The imbalance is measured at the receiver and each receive antenna port has different attenuation $\alpha_1$. The equation is given by:

$$H_{ef} = \begin{bmatrix} h_{11} & h_{12} & \ldots & h_{1n} \\ h_{21} & h_{22} & \ldots & h_{2n} \\ \vdots & \vdots & \vdots & \vdots \\ h_{m1} & h_{m2} & \ldots & h_{mn} \end{bmatrix} \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}$$

where $$H'_{eff} = H_{eff} \times \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1}.$$

This means that one attenuation value is measured at the receiver, i.e. one imbalance value, corresponding to each of the transmit antenna ports.

According to the second definition of power imbalance one reference transmit antenna port is considered and other attenuations are compared to this reference transmit antenna port. So, according to this definition power imbalance is a ratio of a received signal power associated with a predetermined reference transmit antenna port to a received signal power, associated with the remaining transmit antenna ports of the transmit node, measured at the receive antenna port(s). Hence, the power is normalized compared to the reference transmit antenna port. The equation is given by:

$$H'_{eff} = H_{eff} \times \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1}$$

where $$H_{eff} = \begin{bmatrix} h_{11} & h_{12} & \ldots & h_{1n} \\ h_{21} & h_{22} & \ldots & h_{2n} \\ \vdots & \vdots & \vdots & \vdots \\ h_{m1} & h_{m2} & \ldots & h_{mn} \end{bmatrix} \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix},$$

and the predetermined transmit antenna port may e.g. be transmit antenna port 1 or any other of the transmit ports of the transmit node.

The received power imbalance is the result of a specific transmit antenna port configuration in a base station or in a set of base stations in the downlink example. Thus such base stations can anticipate the possible received power imbalance at some UEs, in which case the base stations can signal so as to trigger the UE to start measuring the received power imbalance. It would practically mean that both the UE and the base station will enter a new, specific mode of operation.

Alternatively, the UE can perform the measurements all the time, i.e. without a specific triggering procedure from the base station, of the received power imbalance and report it to the base station through signalling, and the base station can undertake actions in accordance with the value of the received power imbalance at the UE. This alternative embodiment reduces signalling from the base station, but on the other hand increases the power consumption of the UE by performing the received power imbalance measurements even in situations where such imbalance is clearly not probable. When signalling is needed it can be done dynamically or semi-statically. Dynamic signalling may be performed via control channels such as the Physical Downlink Control Channel (PDCCH). This type of signalling is useful when power imbalance needs to be measured frequently, e.g. when the UE is moving fast and consequently signal power imbalance is changing often. This type of signalling may however result in a considerable overhead. Semi-static signalling may be performed using Radio Resource Control (RRC) signalling. This type of signalling is useful when frequent channel measurement is not needed, e.g. when the UE is moving slowly and signal power imbalance is changing slowly. Anyhow, the downlink reference signals such as CSI-RS and CRS can be used to obtain the Rx power imbalance ($\alpha_i$ with $0 \le i \le n-1$ where n denotes the number of transmit antenna ports) in the UE.

Computation of the Reconstructed CSI (R-CSI)

CSI can be reconstructed and reported directly as if there was no imbalance in the transmission. This can be done by computing equivalent compensated channel $H'_{eff}$ directly in the UE. The $H'_{eff}$ channel model does not suffer from the Rx power imbalance and consequently the computed CSI based on this equivalent channel will represent the R-CSI for a balanced system. This reconstruction is possible as the receive node has the knowledge of $H_{eff}$ and $\alpha_i$ with $1 \le i \le n-1$ separately, where n denotes the number of transmit antenna ports.

If power imbalance detected in the receive node is already compensated by power adjustments in the transmitter side the reconstructed value of CSI computed based on $H_{eff}$ and CSI value based on $H'_{eff}$ will be very close or almost the same if there is no any other mismatch in the system.

This means that for the first iteration of the present method a big difference between R-CSI value computed over $H'_{eff}$ and non reconstructed value computed over $H_{eff}$ can be expected, while for further iterations as transmission power over the reference signals are adjusted, this difference becomes smaller or negligible. This means that the R-CSI might be equal to the non R-CSI. A first iteration of this method may be seen as when signal power imbalance is measured for the first time. This measurement is repeated further while adjusting the power imbalance in the system so as to compensate for the imbalance.

As mentioned, the computation of R-CSI is based on computation of the most appropriate precoder for the estimated channel $H'_{eff}$ which provides the maximum CQI and consequently the best throughput.

In the case of closed-loop precoding the value of R-CSI includes reconstructed rank, reconstructed PMI and reconstructed CQI (R-CQI).

In the case of open-loop precoding the value of R-CSI includes only reconstructed value of rank and reconstructed value of CQI (R-CQI).

Feedback of the R-CSI Value and Power Imbalance to the Transmit Node

The R-CSI value and power imbalance are feedback (sent) to the transmit node to be used for the transmission procedure. The R-CSI value and power imbalance value may preferably be sent as quantised parameter(s) as an indicative corresponding to the feedback. Quantizing these parameters permit to report the value in a reduced number of bits. The current CSI is already quantized and as long as the current CSI is replaced with R-CSI, the same quantization procedure can be reused which means that no new procedures has to be introduced. Indicative of signal power imbalance related to several antennas may also be quantized as well.

The feedback indicating the Rx power imbalance can be performed using dynamic signalling or semi-static signalling Dynamic signalling may be performed using uplink control channels such as Physical Uplink Control Channel (PUCCH) and Physical Uplink Shared Channel (PUSCH). PUSCH is sent aperiodically while PUCCH is sent periodically over the uplink propagation channel. For periodic or aperiodic dynamic signalling there is a trade off between signalling overhead and the need for sending new feedback information. For example, for a UE moving fast power imbalance need to be signalled more often which means that dynamic signalling is more appropriate in this case. Semi-static signalling is on the other hand performed by RRC signalling. This type of signalling has less overhead compared to dynamic signalling and is suitable when there is no need for frequent feedback of power imbalance to the eNB. The straightforward example of such an application is the case when the UE is not moving fast so that the propagation channel remains fairly constant.

The feedback content can be the ratio of the received signal power corresponding to a reference, pre-determined transmit antenna port to a received signal power corresponding to the observed transmit antenna port measured over each receive antenna port. Observed transmit antenna port here denotes any remaining transmit antenna port excluding the reference antenna port. Alternatively, the feedback may contain received signal power associated to each of the transmit antenna ports measured at the receive node.

Therefore, aforementioned feedback content which defines the estimated received signal power imbalance can be expressed as following corresponding to the above definitions.

The first definition can be written as:

$$\begin{bmatrix} 1 & 0 & 0 & 0 \\ 0 & \alpha_1 & 0 & 0 \\ 0 & 0 & \ddots & 0 \\ 0 & 0 & 0 & \alpha_{n-1} \end{bmatrix}$$

where $\alpha_1, \ldots, \alpha_{n-1}$ denote signal power imbalance associated to each transmit antenna port and computed compared to a predetermined reference transmit antenna port (first antenna port in this equation). These values are fed back to the transmit node. This signal power imbalance corresponds to the relationship mentioned in equation 1 and 2. It is assumed that there are n transmit antennas in the system.

The second definition can be written as:

$$\begin{bmatrix} \alpha_0 & 0 & 0 & 0 \\ 0 & \alpha_1 & 0 & 0 \\ 0 & 0 & \ddots & 0 \\ 0 & 0 & 0 & \alpha_{n-1} \end{bmatrix}$$

where $\alpha_0, \ldots, \alpha_{n-1}$ denote received signal power imbalance associated with each transmit antenna port measured at each receive antenna port separately. These values are fed back to the transmit node. This signal power imbalance corresponds to the relationship mentioned in equation 3 and 4.

In other words, reported Reference Signal Received Power (RSRP) of each transmit antenna port can be used in the base station to calculate Rx power imbalance at the UE, while R-CSI value may be sent using existing mechanism normally used for CSI reporting.

Determination of the Precoding Matrix for User Specific Signal Transmission

Based on received R-CSI information the transmit node selects the appropriate precoding matrix for transmission. This transmission could be transmission of data or reference signals. Precoder selection related to this UE-specific signal transmission could be related to reference signals used for data transmission (DM-RS) or reference signals used for measurement (CSI-RS). This means that the precoder selection based on R-CSI can be performed over reference signals used for measurement and demodulation since both of these types of signals are precoded.

User Specific Signal Transmission Taking Into Account Power Adjustment

The transmission power relative to transmit antenna ports is adjusted based on the power imbalance feedback received from the receive node. The transmission power may be adjusted both over transmitted data and reference signals. The compensation of power imbalance can be performed by increasing the power of attenuated transmit antenna port or decreasing the power of the strongest transmit antenna port.

In the downlink case of a LTE (i.e. Rel. 10), UE specific signal transmission could be related to reference signals used for data transmission (DM-RS) or reference signals used for measurement (CSI-RS). It is important to note that when the system is using UE-specific reference signals, i.e. CSI-RS for measurement and DM-RS for demodulation as in LTE (Rd. 10), power adjustment for measurement and demodulation can be performed independently over reference signals. This leaves the freedom of choosing the appropriate power adjustment on reference signals for data demodulation for a specific UE.

Assuming Cell-specific reference signals, i.e. CRSs, are used for both data demodulation and measurement as in LTE (Rel. 8/9), and as CRSs are cell-specific and concern all the users in a cell one cannot adjust the transmission power of reference signals used for demodulation. In this case it is possible to adjust the power of scheduled data symbols dedicated to a desired user to take into account the power imbalance. However, in this case it is expected that the demodulation performance is deteriorated as the channel will be poorly estimated due to the usage of cell-specific reference signals.

In practice there might be some cases where the power imbalance cannot be completely compensated. For example, if the transmit node does not dispose the power amplifiers with large back-off it cannot totally compensate the power imbalance and power imbalance might be adjusted partially.

Another example is the case when a mobile terminal is constantly moving creating a residual power imbalance which is not compensated. Any other mismatch in the communication system might result in partial power imbalance compensation.

If the transmission power is adjusted partially over UE-specific reference signals, there will be a mismatch between reconstructed CSI report which is computed assuming total power compensation and adjusted power for transmission which corresponds to the partial power compensation. This mismatch can be avoided in different manners.

One alternative is that when partial power compensation happens, the eNB sends signalling information to the UE indicative of the value of compensated power imbalance. Hence, the UE can reconstruct and compute the CSI which matches to this power imbalance immediately in the next iteration step.

Even if the reconstructed CSI report is not immediately corrected, the partial power adjustment can be measured in the UE after some iteration steps during measurement procedure. Therefore, after a number of iterations one can expect to obtain an R-CSI report which matches more or less with the partial power imbalance.

If there is any residual power imbalance in the system due to the hardware implementation then it can be neglected after a few iterations, because a small power imbalance will not affect the system throughput considerably. Further, partial power imbalance correction, noise enhancement related to channel estimation at the UE or other mismatches results in some errors on CSI reconstruction which might affect the final system performance. But the correction principle remains valid and is supposed to provide some gain.

Any kind of mismatch in receiver or transmitter which creates power imbalance at the receiver antenna ports can be considered to be resolved by this solution including mismatches due to the physical antenna system structure, hardware elements (i.e. Automatic Gain Control (AGC)) or mismatches related to hand-gripping of the terminal.

Exemplary Implementation of the Disclosure in an UE and in a Base Station

Figure 7:
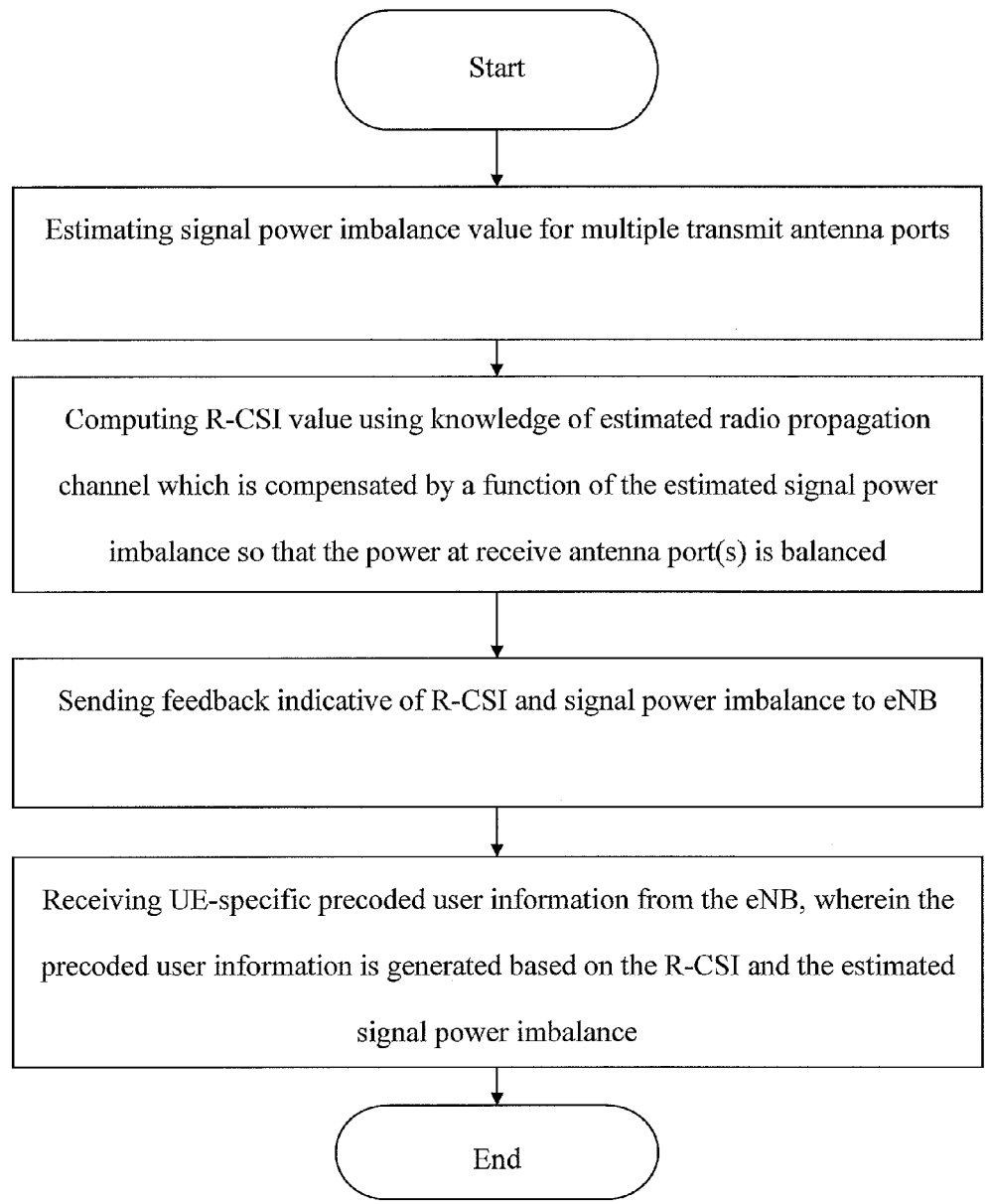
FIG. 7 shows a flow chart of UE behaviour according to an embodiment of the disclosure.

FIG. 7 shows a flowchart describing an embodiment of the present method in a receive node, such as an UE. In this case the transmission is downlink transmission. However, it should be noted that the disclosure is not limited to the downlink case but applies as long as the transmit node has at least two transmit antenna ports and the receive node has at least one receive antenna port.

In the first step, a signal power imbalance for transmit antenna ports belonging to a transmit node (in this case a base station) is estimated at the UE. Thereafter R-CSI is computed, and the R-CSI and the signal power imbalance is sent to the transmit node as an indicative. Finally, precoded user information dedicated for the UE is received by the UE, where the precoded user information is generated based on the R-CSI and power imbalance by the transmit node.

Figure 8:
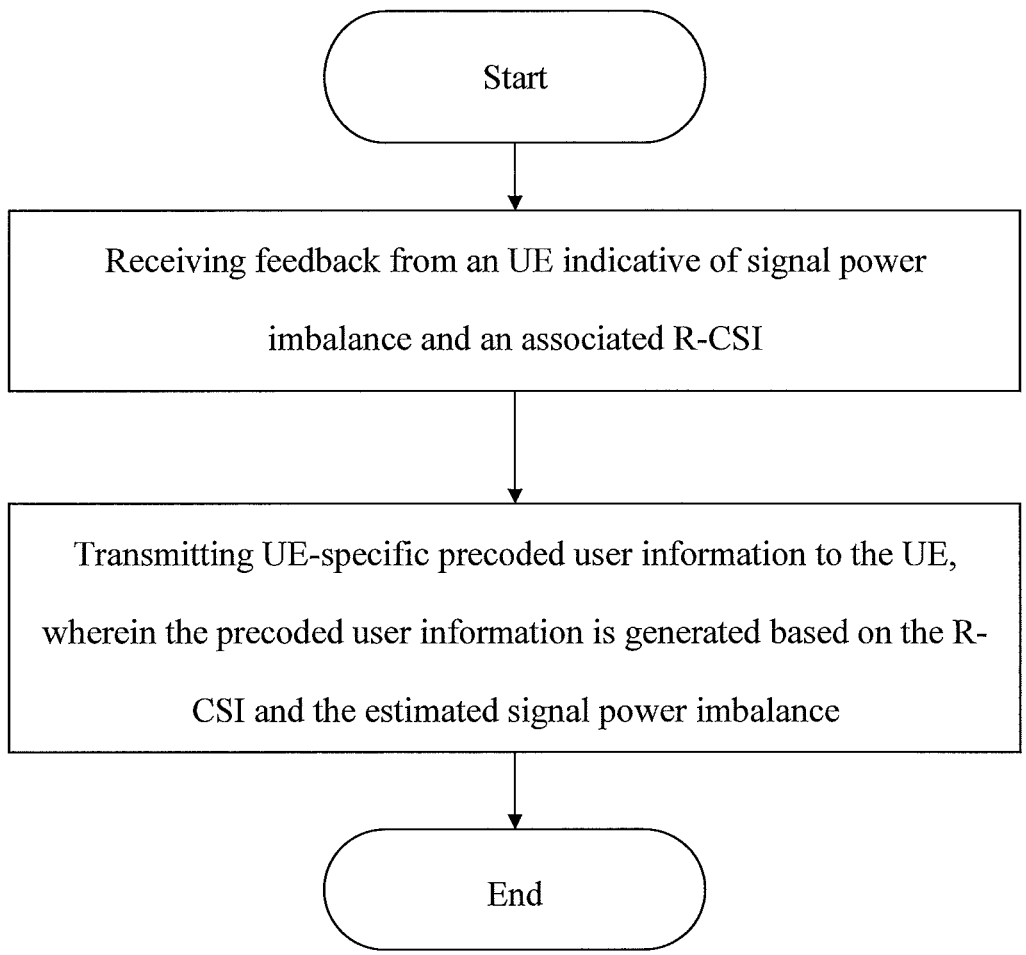
FIG. 8 shows a flow chart of eNB behaviour according to an embodiment of the disclosure.

FIG. 8 shows a flowchart describing an embodiment of the present method in a transmit node, such as an eNB base station. This method comprises, receiving feedback from a receive node (in this case an UE) indicative of a signal power imbalance and R-CSI. Thereafter, the base station transmits precoded user information which is generated based on the R-CSI and power imbalance.

Simulation Results

In this section the normalized throughput related to the usage of the present method is presented. Simulation results are shown in FIG. 9 and FIG. 10.

Figure 9:
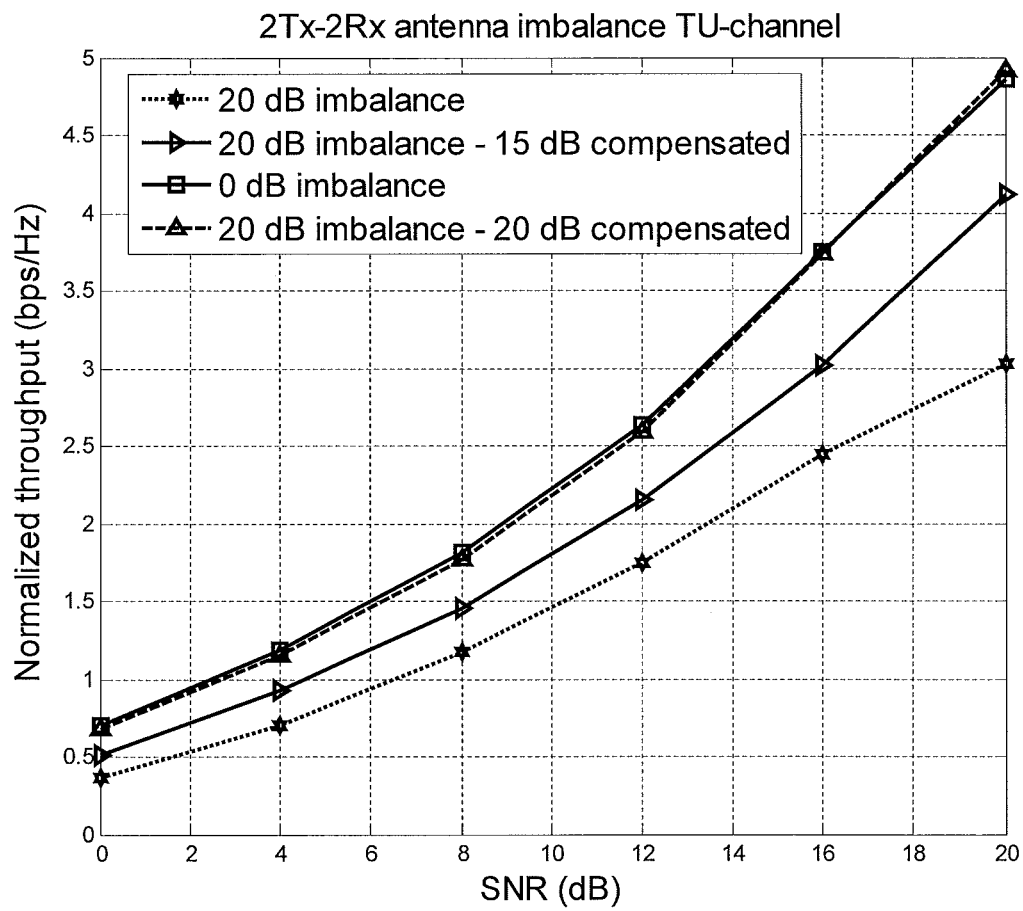
FIG. 9 shows normalized throughput related to power imbalance on received antenna ports and the correction made to compensate power imbalance, where power adjustment over CSI-RS and DM-RS and data are considered to be equal.

In the simulation scenario in FIG. 9 an imbalance of 20 dB in a 2×2 (2 transmit antenna ports and 2 receive antenna ports) system was corrected by increasing the power on second transmit antenna port of 20 dB which is shown with line marked with "□". It is shown that the present method can improve the throughput about 38% for high values of SNR.

The case of partial power imbalance adjustment is shown as well in FIG. 9. It is shown that if only 15 dB of imbalance is corrected instead of 20 dB over both DM-RS/data and CSI-RS, a considerable improvement for all values of SNR can be expected. For example an improvement of 26% is expected for high values of SNR. In these simulations it was assumed that CSI reconstruction (rank, PMI and CQI reconstruction) was done perfectly, i.e. the estimated propagation channel was equal to the real propagation channel and there is no estimation noise.

Figure 10:
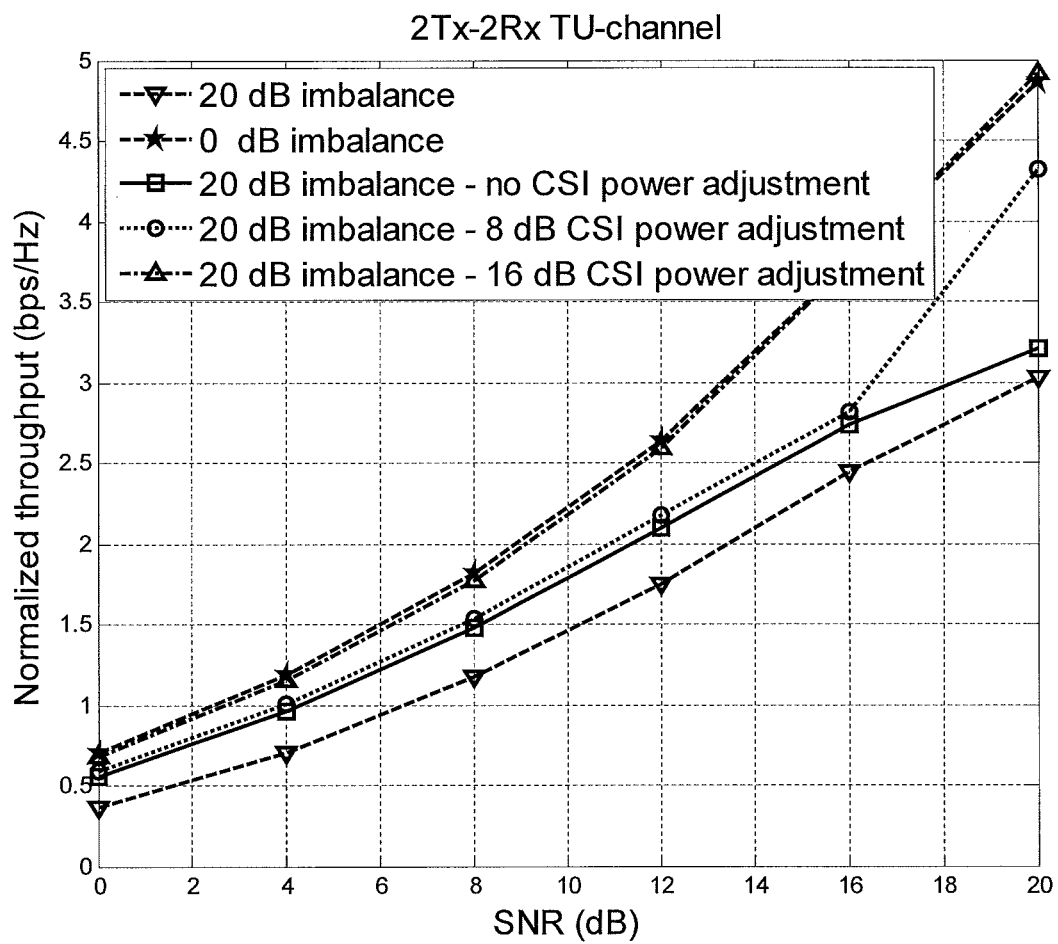
FIG. 10 shows the normalized throughput related to power imbalance on received antenna ports and the correction made to compensate power imbalance, where it is assumed that power imbalance over DM-RS and data is completely adjusted but power imbalance for CSI is only partially adjusted.

FIG. 10 shows the case where CSI-RS power is not perfectly adjusted due to limited back-off of power amplifiers for adjustment of CSI-RS power. It was assumed that DM-RS power and data symbol power were completely adjusted. Further, it was assumed that CSI reconstruction (rank, PMI and CQI reconstruction) was done perfectly. It can be seen from FIG. 10 that even if CSI-RS power is not perfectly adjusted the throughput could be improved. For example if there is no power adjustment of CSI-RS, throughput for high values of SNR can be improved only about 5% compare to the case where there is 20 dB imbalance. This improvement becomes more important once CSI-RS power is adjusted with partial power with less error i.e. 8 dB and 16 dB for CSI-RS power compensation.

Furthermore, as understood by the person skilled in the art, any method according to the present disclosure may also be implemented in a computer program, having code means, which when run in a computer/processor causes the computer/processor to execute the steps of the method. The computer program is included in a computer readable medium of a computer program product. The computer readable medium may consist of essentially any memory, such as a ROM (Read-Only Memory), a PROM (Programmable Read-Only Memory), an EPROM (Erasable PROM), a Flash memory, an EEPROM (Electrically Erasable PROM), or a hard disk drive.

Moreover, the disclosure also relates to a transmit node device and a receive node device and to a wireless communication system comprising at least one such device. Mentioned devices may be modified, mutatis mutandis, according to different embodiments of any of the methods above.

Finally, it should be understood that the present disclosure is not limited to the embodiments described above, but also relates to and incorporates all embodiments within the scope of the appended independent claims.

The invention claimed is:

1. A method of channel state information (CSI) transmission in a wireless communication system, the wireless communication system comprising at least one transmit node having at least two transmit antenna ports, and at least one receive node having at least one receive antenna port, transmission of user information between the at least two transmit antenna ports and the at least one receive antenna port being performed on a radio propagation channel, the method comprising:
  computing a reconstructed channel state information (R-CSI) for a reconstructed radio propagation channel, the reconstructed radio propagation channel being obtained as an estimated radio propagation channel compensated by a function of an estimated signal power imbalance between the at least two transmit antenna ports; and
  sending an indicative of the estimated signal power imbalance and the R-CSI to the at least one transmit node.

2. The method according to claim 1, further comprising:
  measuring reference signals received from the at least two transmit antenna ports, and
  estimating the signal power imbalance based on measurement of the reference signals.

3. The method according to claim 2, wherein the step of estimating is triggered by signalling information from the at least one transmit node to the at least one receive node.

4. The method according to claim 3, wherein the signalling information is signalled dynamically or semi-statically.

5. The method according to claim 1, wherein the estimated signal power imbalance is received signal power associated with each of the at least two transmit antenna ports measured at the at least one receive antenna port.

6. The method according to claim 1, wherein the estimated signal power imbalance is a ratio of a received signal power associated with a predetermined reference transmit antenna port to a received signal power associated with remaining transmit antenna ports measured at the at least one receive antenna port.

7. The method according to claim 1, wherein the R-CSI comprises at least one of the following: a reconstructed transmission rank, a reconstructed precoding matrix indicator (R-PMI), and a reconstructed channel quality indicator (R-CQI).

8. The method according to claim 1, wherein the indicative of the estimated signal power imbalance is used for adjusting transmit power for each of the at least two transmit antenna ports.

9. The method according to claim 8, wherein the adjusting of transmit power involves: increasing or decreasing transmit power so as to fully or partially compensating for the estimated signal power imbalance.

10. The method according to claim 1, further comprising:
  determining a precoding matrix based on the R-CSI, and
  using the precoding matrix for transmission of the user information.

11. The method according to claim 1, wherein the reconstructed radio propagation channel $H'_{eff}$ is defined as:

$$H'_{eff} = H_{eff} \times \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1},$$

where $$H_{eff} = \begin{bmatrix} h_{11} & h_{12} & \ldots & h_{1n} \\ h_{21} & h_{22} & \ldots & h_{2n} \\ \vdots & \vdots & \vdots & \vdots \\ h_{m1} & h_{m2} & \ldots & h_{mn} \end{bmatrix} \begin{bmatrix} 1 & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix},$$

and wherein $\alpha_1, \ldots, \alpha_{n-1}$ denote the signal power imbalance associated with each transmit antenna port and computed compared to a predetermined reference transmit antenna port, $h_{ij}$ denotes the radio propagation channel between receive antenna port i and transmit antenna port j, m denotes the number of receive antenna ports, and n denotes the number of transmit antenna ports.

12. The method according to claim 1, wherein the reconstructed radio propagation channel $H'_{eff}$ is defined as:

$$H'_{\text{eff}} = H_{\text{eff}} \times \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix}^{-1},$$

where $$H_{\text{eff}} = \begin{bmatrix} h_{11} & h_{12} & \cdots & h_{1n} \\ h_{21} & h_{22} & \cdots & h_{2n} \\ \vdots & \vdots & \vdots & \vdots \\ h_{m1} & h_{m2} & \cdots & h_{mn} \end{bmatrix} \begin{bmatrix} \sqrt{\alpha_0} & 0 & 0 & 0 \\ 0 & \sqrt{\alpha_1} & 0 & 0 \\ 0 & 0 & \ddots & 0 \\ 0 & 0 & 0 & \sqrt{\alpha_{n-1}} \end{bmatrix},$$

and wherein $\alpha_0, \ldots, \alpha_{n-1}$ denote the signal power imbalance associated with each transmit antenna port, $h_{ij}$ denotes said radio propagation channel between receive antenna port i and transmit antenna port j, m denotes the number of receive antenna ports and n denotes the number of transmit antenna ports.

13. The method according to claim 1, wherein the user information comprising a reference signal and/or user data.

14. The method according to claim 1, wherein the indicative of the estimated signal power imbalance is sent using dynamic signalling or semi-static signalling.

15. The method according to claim 1, wherein the wireless communication system is a long term evolution (LTE) system or a long term evolution advanced (LTE-A) system, the transmit node is a base station (eNB), and the receive node is a user equipment (UE).

16. The method according to claim 1, wherein the wireless communication system employs coordinated multipoint transmission (CoMP) techniques.

17. A device, comprising:
at least one receive antenna port being adapted to receive user information from a transmit node device having at least two transmit antenna ports for transmission of the user information, transmission of the user information between the at least two transmit antenna ports and said at least one receive antenna port being performed on a radio propagation channel, the device being adapted to:
compute a reconstructed channel state information (R-CSI) for a reconstructed radio propagation channel, the reconstructed radio propagation channel being obtained as an estimated radio propagation channel compensated by a function of an estimated signal power imbalance between the at least two transmit antenna ports; and
send an indicative of the estimated signal power imbalance and the R-CSI to the at least one transmit node.

18. A device, comprising:
at least two transmit antenna ports being adapted to transmit user information to a receive node having at least one receive antenna port for receiving the user information, transmission of the user information between the at least two transmit antenna ports and the at least one receive antenna port being performed on a radio propagation channel, the device being adapted to:
receive an indicative of an estimated signal power imbalance between the at least two transmit antenna ports and a reconstructed channel state information (R-CSI) for a reconstructed radio propagation channel from the receive node, the reconstructed radio propagation channel being obtained as an estimated radio propagation channel compensated by a function of the estimated signal power imbalance, and
use the estimated signal power and the reconstructed channel state information (R-CSI) for transmission of the user information from the at least two transmit antenna ports to the at least one receive antenna port.

19. The device according to claim 18, further comprising a radio frequency part including a plurality of radio resource units (RRUs).

20. The device according to claim 18, wherein the device is operable in a frequency division duplexing (FDD) system.

* * * * *

UNITED STATES PATENT AND TRADEMARK OFFICE
CERTIFICATE OF CORRECTION

| | | |
|---|---|---|
| PATENT NO. | : 9,210,710 B2 | Page 1 of 1 |
| APPLICATION NO. | : 14/153426 | |
| DATED | : December 8, 2015 | |
| INVENTOR(S) | : Anahid Robert Safavi et al. | |

It is certified that error appears in the above-identified patent and that said Letters Patent is hereby corrected as shown below:

On the title page of the patent, item (73), line 2, delete "Suwon-Si (KR)" and insert --SHENZHEN (CN)-- therefor.

Signed and Sealed this
Twenty-ninth Day of March, 2016

Michelle K. Lee
*Director of the United States Patent and Trademark Office*